United States Patent
Bechtler et al.

(10) Patent No.: US 8,401,730 B2
(45) Date of Patent: Mar. 19, 2013

(54) GOOD CHECKING FOR VEHICLE LATERAL ACCELERATION SENSOR

(75) Inventors: Henrik Bechtler, Stuttgart (DE); Ravi Bhadange, Farmington, MI (US); Nachiket Patil, Farmington Hills, MI (US); Takeshi Tokonaga, Yokohama (JP); Stefan Mallmann, Lauffen (DE); Michael Schwab, Korntal (DE); Dietmar Stapel, Sendenhorst (DE); Willy Klier, Bloomfield Hills, MI (US); Joerg Eesmann, Rheine (DE)

(73) Assignee: Robert Bosch LLC, Broadview, IL (US)

( * ) Notice: Subject to any disclaimer, the term of this patent is extended or adjusted under 35 U.S.C. 154(b) by 286 days.

(21) Appl. No.: 12/860,376

(22) Filed: Aug. 20, 2010

(65) Prior Publication Data
US 2011/0071726 A1    Mar. 24, 2011

Related U.S. Application Data

(60) Provisional application No. 61/236,399, filed on Aug. 24, 2009.

(51) Int. Cl.
G06F 19/00    (2011.01)
G07C 5/00     (2006.01)
G01P 21/00    (2006.01)

(52) U.S. Cl. ............... 701/29.7; 701/29.8; 701/30.1; 701/30.3; 701/30.4; 701/30.9; 701/31.1; 701/31.2; 73/1.37

(58) Field of Classification Search ............... 73/1.37; 701/29.7–31.7
See application file for complete search history.

(56) References Cited

U.S. PATENT DOCUMENTS

| | | | |
|---|---|---|---|
| 3,798,596 A | 3/1974 | Sumiyoshi et al. |
| 3,803,425 A | 4/1974 | Carp |
| 3,916,375 A | 10/1975 | Sumiyoshi et al. |
| 4,219,244 A | 8/1980 | Griner et al. |
| 4,233,599 A | 11/1980 | Brearley |
| 4,234,866 A | 11/1980 | Kuroda et al. |
| 4,648,662 A | 3/1987 | Fennel et al. |
| 4,839,811 A | 6/1989 | Kanegae et al. |
| 4,886,291 A | 12/1989 | Okamoto |
| 4,934,474 A | 6/1990 | Sugasawa |
| 4,953,652 A | 9/1990 | Ohmura et al. |
| 4,996,657 A | 2/1991 | Shiraishi et al. |
| 5,008,823 A | 4/1991 | Takahashi |
| 5,014,801 A | 5/1991 | Hirose |

(Continued)

FOREIGN PATENT DOCUMENTS
EP    1227019    7/2002
IT    1116563    2/1986

OTHER PUBLICATIONS

EP10173774 European Search Report dated Nov. 30, 2010, 5 pages.

(Continued)

*Primary Examiner* — Ryan Zeender
*Assistant Examiner* — Allen Chein
(74) *Attorney, Agent, or Firm* — Michael Best & Friedrich LLP

(57) ABSTRACT

A controller for indicating whether a previously-detected, acceleration-sensor malfunction no longer exists. The controller includes an electronic memory and an electronic processing unit connected to the electronic memory. The electronic processing module includes a malfunction monitoring module, a failure handling module, and a signal checking module. The signal checking module performs a signal check after the malfunction monitoring module generates the fault signal. The signal check includes executing a signal check function with a lateral acceleration signal. Also disclosed is a vehicle including the controller, and a method executed by the controller.

18 Claims, 7 Drawing Sheets

U.S. PATENT DOCUMENTS

| | | | |
|---|---|---|---|
| 5,200,911 A | | 4/1993 | Ishikawa et al. |
| 5,201,380 A | | 4/1993 | Callahan |
| 5,271,475 A | | 12/1993 | Takeshita |
| 5,282,135 A | | 1/1994 | Sato et al. |
| 5,283,740 A | | 2/1994 | Sato et al. |
| 5,305,723 A | * | 4/1994 | Kadota .................. 123/479 |
| 5,357,141 A | * | 10/1994 | Nitschke et al. ............. 307/10.1 |
| 5,448,480 A | | 9/1995 | Rauner et al. |
| 5,457,632 A | | 10/1995 | Tagawa et al. |
| 5,481,906 A | | 1/1996 | Nagayoshi et al. |
| 5,572,670 A | | 11/1996 | Puckett |
| 5,636,121 A | * | 6/1997 | Tsuyama et al. ............... 701/70 |
| 5,671,981 A | | 9/1997 | Sasaki et al. |
| 5,710,704 A | * | 1/1998 | Graber ........................ 701/82 |
| 5,928,110 A | | 7/1999 | Vornehm et al. |
| 6,035,693 A | | 3/2000 | Horiuchi |
| 6,134,491 A | | 10/2000 | Kawagoe et al. |
| 6,144,904 A | | 11/2000 | Tseng |
| 6,198,988 B1 | * | 3/2001 | Tseng ............................ 701/1 |
| 6,212,465 B1 | | 4/2001 | Sielagoski et al. |
| 6,292,733 B1 | | 9/2001 | Sugiyama et al. |
| 6,301,536 B1 | | 10/2001 | Vaessen et al. |
| 6,305,760 B1 | | 10/2001 | Otake |
| 6,354,607 B1 | | 3/2002 | Kawashima et al. |
| 6,408,229 B1 | * | 6/2002 | Loudon et al. .................... 701/1 |
| 6,427,102 B1 | | 7/2002 | Ding |
| 6,491,357 B2 | | 12/2002 | Holst |
| 6,502,025 B1 | | 12/2002 | Kempen |
| 6,519,515 B1 | | 2/2003 | Baumann et al. |
| 6,577,948 B1 | | 6/2003 | Skellenger et al. |
| 6,682,153 B2 | * | 1/2004 | Okai .................... 303/122.05 |
| 6,834,221 B2 | | 12/2004 | Jäger et al. |
| 7,057,503 B2 | | 6/2006 | Watson |
| 7,058,490 B2 | | 6/2006 | Kim |
| 7,085,642 B2 | | 8/2006 | Samuel et al. |
| 7,191,041 B2 | | 3/2007 | von Schwertfuehrer et al. |
| 7,200,524 B2 | | 4/2007 | Kang et al. |
| 7,823,986 B2 | | 11/2010 | Ruffer et al. |
| 8,155,823 B2 | | 4/2012 | Itoh |
| 8,159,945 B2 | | 4/2012 | Muro et al. |
| 8,260,516 B2 | | 9/2012 | Bechtler et al. |
| 2001/0044688 A1 | | 11/2001 | Okita et al. |
| 2001/0051845 A1 | | 12/2001 | Itoh |
| 2002/0075137 A1 | | 6/2002 | Hofbeck et al. |
| 2002/0101115 A1 | * | 8/2002 | Holst .................... 303/122.03 |
| 2002/0113587 A1 | * | 8/2002 | Kim .......................... 324/210 |
| 2002/0189889 A1 | | 12/2002 | Demerly |
| 2003/0109939 A1 | | 6/2003 | Burgdorf et al. |
| 2003/0149540 A1 | | 8/2003 | Kachel et al. |
| 2004/0026148 A1 | | 2/2004 | Matsuno |
| 2004/0030474 A1 | | 2/2004 | Samuel et al. |
| 2004/0243287 A1 | | 12/2004 | Yanaka et al. |
| 2005/0131602 A1 | | 6/2005 | Souda |
| 2005/0228546 A1 | | 10/2005 | Naik et al. |
| 2006/0173584 A1 | | 8/2006 | Einig et al. |
| 2006/0181066 A1 | | 8/2006 | Andres et al. |
| 2007/0129871 A1 | | 6/2007 | Post, II et al. |
| 2007/0250183 A1 | | 10/2007 | Howell et al. |
| 2007/0279207 A1 | | 12/2007 | Clark et al. |
| 2007/0282558 A1 | | 12/2007 | Sagisaka |
| 2008/0097671 A1 | | 4/2008 | Kojo et al. |
| 2008/0176122 A1 | | 7/2008 | Wake et al. |
| 2008/0183350 A1 | | 7/2008 | Noguchi |
| 2008/0195275 A1 | | 8/2008 | Kojo et al. |
| 2009/0055033 A1 | | 2/2009 | Gansler et al. |
| 2009/0069978 A1 | | 3/2009 | Inage |
| 2009/0164059 A1 | | 6/2009 | Takeda |
| 2010/0014302 A1 | | 1/2010 | Okumura et al. |
| 2010/0138105 A1 | | 6/2010 | Shibasaki et al. |
| 2010/0269500 A1 | | 10/2010 | Ruffer et al. |
| 2010/0274436 A1 | | 10/2010 | Kodaka et al. |
| 2011/0066319 A1 | | 3/2011 | Bechtler et al. |
| 2011/0066320 A1 | | 3/2011 | Bechtler et al. |
| 2011/0066321 A1 | | 3/2011 | Bechtler et al. |
| 2011/0068913 A1 | | 3/2011 | Bechtler et al. |
| 2011/0071723 A1 | | 3/2011 | Bechtler et al. |
| 2011/0071727 A1 | | 3/2011 | Bechtler et al. |

OTHER PUBLICATIONS

Office Action from the United States Patent and Trademark Office for U.S. Appl. No. 12/860,362 dated Jul. 19, 2012 (23 pages).
Harland, David M., Lorenz, Ralph D., "Space Systems Failures", Springer Praxis Books, 2005, Part Two, 211-226, available at http://www.springerlink.com/content!n886138036412186/.
Office Action from the United States Patent and Trademark Office for U.S. Appl. No. 12/860,370 dated Jul. 5, 2012 (21 pages).
Notice of Allowance from the United States Patent and Trademark Office for U.S. Appl. No. 12/860,389 dated May 15, 2012 (8 pages).
Office Action from the United States Patent and Trademark Office for U.S. Appl. No. 12/860,407 dated Sep. 14, 2012 (18 pages).
Office Action from the United States Patent and Trademark Office for U.S. Appl. No. 12/860,418 dated Jul. 5, 2012 (23 pages).

* cited by examiner

GOOD CHECKING FOR VEHICLE LATERAL ACCELERATION SENSOR

RELATED APPLICATION

The present application claims the benefit of prior filed U.S. Provisional Patent Application No. 61/236,399 filed on Aug. 24, 2009, the entire content of which is hereby incorporated by reference.

This application is related to the following United States patent applications: United States patent applications: U.S. patent application Ser. No. 12/860,362, filed on Aug. 20, 2010 entitled GOOD CHECKING FOR VEHICLE WHEEL SPEED SENSORS; and U.S. patent application Ser. No. 12/860,370, filed on Aug. 20, 2010 and entitled GOOD CHECKING FOR VEHICLE LONGITUDINAL ACCELERATION SENSOR; and U.S. patent application Ser. No. 12/860,389, filed on Aug. 20, 2010 and entitled GOOD CHECKING FOR VEHICLE BRAKE LIGHT SWITCH; and U.S. patent application Ser. No. 12/860,396, filed on Aug. 20, 2010 and entitled GOOD CHECKING FOR VEHICLE PRESSURE SENSOR; and U.S. patent application Ser. No. 12/860,407, filed on Aug. 20, 2010 and entitled GOOD CHECKING FOR VEHICLE STEERING ANGLE SENSOR; and U.S. patent application Ser. No. 12/860,418, filed on Aug. 20, 2010 and entitled GOOD CHECKING FOR VEHICLE YAW RATE SENSOR.

FIELD OF THE INVENTION

Embodiments of the invention relate to methods, systems, and controllers for indicating whether a malfunction no longer exists in a previously malfunctioning sensor, such as an acceleration sensor for a vehicle.

BACKGROUND

Today's vehicles include a large number of systems for controlling aspects of the vehicle, including engine emissions, anti-lock braking, passenger restraints, and much more. Each of these systems requires information in order to function, such as yaw-rate data, or vehicle acceleration data. This information is generally obtained from sensors located throughout the vehicle. To ensure the integrity of the information, controllers perform failure analysis and testing on the sensors and the signals or data the sensors provide. If an error is detected in the information transmitted from the sensor, a controller can implement an alternate operating state for the vehicle control module. The alternate operating state may ignore the faulty sensor or may turn off the vehicle control module entirely. The controller may also generate an error signal (e.g., a tell-tale indicator such as a "check engine" warning light) to inform the operator of the vehicle of the malfunction.

SUMMARY

While current vehicle systems are designed to monitor the functioning or operation of vehicle sensors and determine when a sensor malfunction occurs, such systems lack, at least in general, robust abilities for determining when the sensor malfunction ends. For example, a sensor malfunction might be caused by a powerful source of electromagnetic interference ("EMI"). Such a circumstance might occur if a vehicle passes near an electrical power generation plant, a radar or broadcast installation, or similar location. Once the vehicle moves outside the range of the EMI, the output from the sensor might return to within an acceptable range. However, in many vehicles, once a sensor malfunction occurs, the only way in which the malfunction or error may be cleared is to have a mechanic or technician access the system, check its operation, and perform an act that resets the system or otherwise removes the error.

A check of the sensor signal based on a re-detection by the failure monitoring function can be used as a mechanism to determine if a sensor has returned to normal operation. However, good checking is more than this. In general, malfunction monitoring functions are designed to avoid misdetection. On the other hand, good check functions are, in general, designed to avoid a false good check, i.e., a good check function has smaller tolerances for deviations and fewer conditions on the driving situation to perform the evaluation. Or, in other words, the tolerances and conditions used in good checking are different than those used to detect a malfunction.

Embodiments of the invention provide a mechanism for automatically determining whether a malfunctioning sensor has returned to a normal or acceptable operating range. In the parlance of the inventors, embodiments of the invention perform a "good check" on the sensor to determine whether the sensor has returned to normal or acceptable operation after a malfunction has been detected. When a previously-malfunctioning sensor passes the "good check," warning lights (or tell-tale) indicators are shut off and systems that relied upon information from the malfunctioning sensor return to normal operation.

In one embodiment, the invention provides a controller for indicating whether a previously-detected, acceleration-sensor malfunction no longer exists. The controller includes an electronic memory and an electronic processing unit connected to the electronic memory. The electronic processing module includes a malfunction monitoring module, a failure handling module, and a signal checking module.

The malfunction monitoring module monitors the operation of an acceleration sensor and generates a fault signal when the acceleration sensor malfunctions. The fault signal contains fault information and causes a tell-tale indicator to be activated or a vehicle control module to modify its operation from a first operating state to a second operating state. The failure handling module stores the fault information and corresponding drive cycle information in the electronic memory.

The signal checking module performs a signal check after the malfunction monitoring module generates the fault signal. The signal check includes retrieving drive cycle information from the electronic memory, determining whether to execute a signal check function based on the drive cycle information, executing the signal check function with a lateral acceleration signal, determining whether the lateral acceleration signal passes the signal check function, and generating a reset signal if the lateral acceleration signal passes the signal check. The reset signal causes at least one of the tell-tale indicator to be deactivated or a vehicle control module to resume operation in the first operating state.

The acceleration sensor can be a single sensor or an acceleration sensor suite having one or more acceleration sensors and associated devices, such as filters, etc.

In some embodiments, the malfunction monitoring module monitors the operation of the acceleration sensor by detecting a fault with the lateral acceleration signal and generates the fault signal based on the detection of the fault. Executing the signal check function includes comparing the lateral acceleration signal with a predetermined threshold. Comparing the lateral acceleration signal with the predetermined threshold further includes comparing a lateral acceleration value with the predetermined threshold. Executing the signal check function includes determining a maximum yaw rate value from a measured value from a yaw rate sensor and a modeled value calculated from the acceleration sensor, determining a minimum yaw rate value from the measured value and the modeled value, and comparing the difference of the maximum yaw rate value and the minimum yaw rate value with a predetermined threshold, and wherein the determining whether the lateral acceleration signal passes the signal check function is based on the comparison of the difference of the maximum yaw rate value and the minimum yaw rate value with the predetermined threshold.

In some embodiments, the lateral acceleration signal includes an offset value. Executing the signal check function includes comparing the offset value with a predetermined threshold, the predetermined threshold being based on a distance value. Executing the signal check function includes performing a plausibility check with the lateral acceleration signal. Executing the signal check function includes performing a stuck signal check with the lateral acceleration signal.

In some embodiments, the acceleration sensor is connected to the controller. The acceleration sensor includes a lateral acceleration sensor generating the lateral acceleration signal. The acceleration sensor consists of a lateral acceleration sensor generating the lateral acceleration signal.

In another embodiment, the invention provides a method executed by the controller including the electronic processing unit and an electronic memory. The malfunction monitoring module, failure handling module, and the good-signal checking module are executed by the electronic processing unit to result in the method.

In another embodiment, the invention provides a method executed by a controller, including an electronic processing unit and an electronic memory, for determining whether a previously-detected, acceleration-sensor malfunction no longer exists. The method includes the steps of monitoring the operation of an acceleration sensor with a malfunction monitoring module executed by the electronic processing unit, generating a fault signal containing fault information with the malfunction monitoring module when the acceleration sensor malfunctions, causing at least one of a tell-tale indicator to be activated or a vehicle control module to modify its operation from a first operating state to a second operating state, storing drive cycle information and the fault information in the electronic memory with a failure handling module executed by the electronic processing unit, and performing a signal check after the generating the fault signal with a signal checking module executed by the electronic processing unit. The signal check includes retrieving the drive cycle information from the electronic memory, determining whether to execute a signal check function based on the drive cycle information, executing the signal check function with a lateral acceleration signal, determining whether the lateral acceleration signal passes the signal check function, and generating a reset signal when the lateral acceleration signal passes the signal check, the reset signal causing at least one of the tell-tale indicator to be deactivated or the vehicle control module to resume operation in the first operating state.

In some embodiments, monitoring the operation of the acceleration sensor includes detecting a fault with the lateral acceleration signal and generating the fault signal based on the detection of the fault. Executing the signal check function includes comparing the lateral acceleration signal with a predetermined threshold. Comparing the lateral acceleration signal with the predetermined threshold further includes comparing a lateral acceleration value with the predetermined threshold. Executing the signal check function further includes determining a maximum yaw rate value from a measured value from a yaw rate sensor and a modeled value calculated from the acceleration sensor, determining a minimum yaw rate value from the measured value and the modeled value, and comparing the difference of the maximum yaw rate value and the minimum yaw rate value with a predetermined threshold, and wherein determining whether the lateral acceleration signal passes the signal check function is based on the comparison of the difference of the maximum yaw rate value and the minimum yaw rate value with the predetermined threshold.

In some embodiments, the lateral acceleration signal includes lateral acceleration information including an offset value. Executing the signal check function includes comparing the offset value with a predetermined threshold, the predetermined threshold being based on a distance value. Executing the signal check function includes performing a plausibility check with the lateral acceleration signal. Executing the signal check function includes performing a stuck signal check with the lateral acceleration signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

As should also be apparent to one of ordinary skill in the art, the systems shown in the figures are models or examples of what actual systems might be like. Many of the modules and logical structures described are capable of being implemented in software executed by a microprocessor or a similar device or of being implemented in hardware using a variety of components including, for example, application specific integrated circuits ("ASICs"). Furthermore, capitalized terms are used throughout the specification. Such terms are used to conform to common practices. However, no specific meaning is implied or should be inferred simply due to the use of capitalization.

Figure 1:
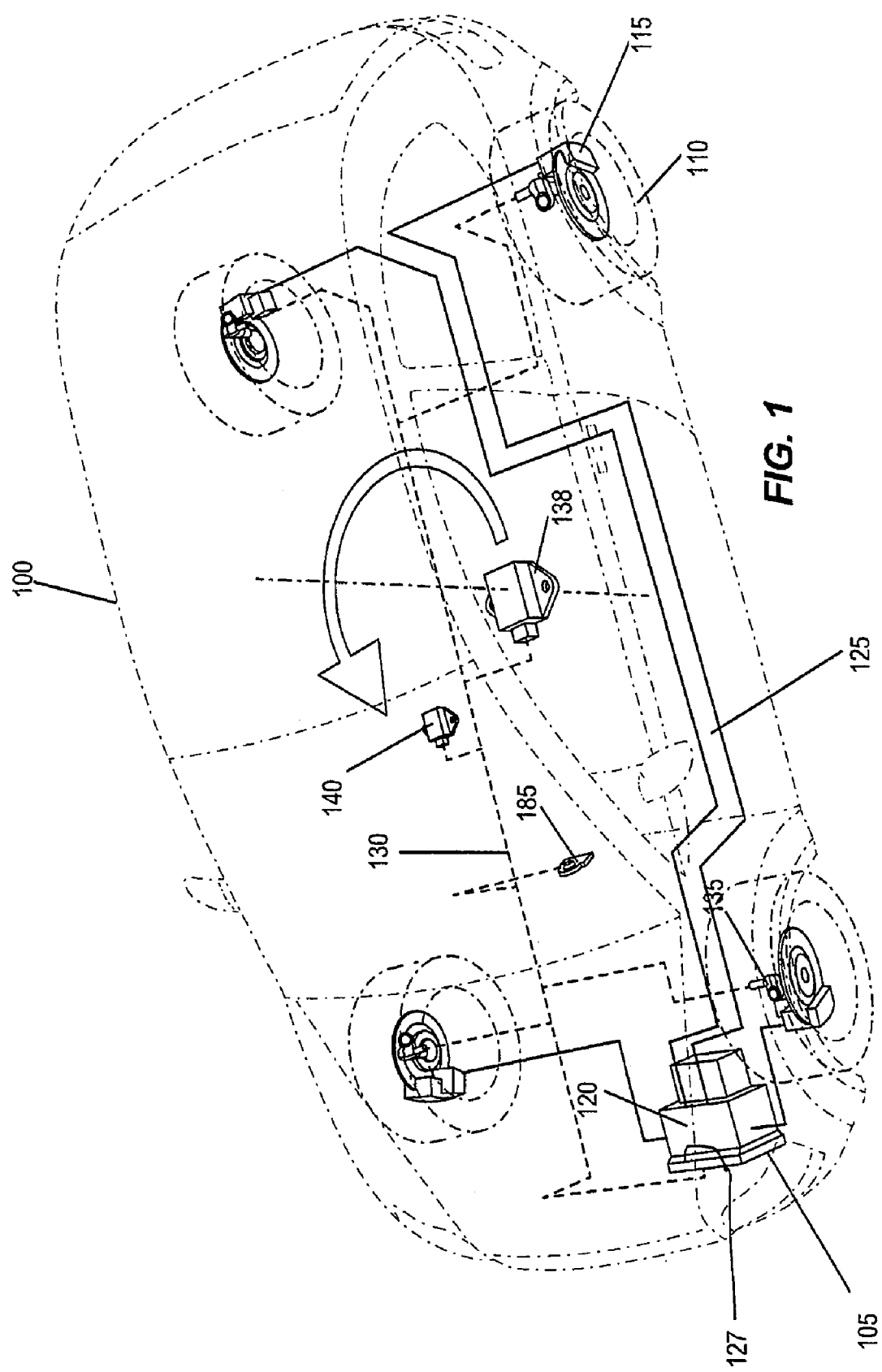
FIG. 1 is a perspective view of a vehicle including a portion of a vehicle control system according to one embodiment of the invention.

FIG. 1 illustrates a vehicle 100 including a vehicle control system 105 according to one embodiment of the invention. The vehicle 100 has wheels 110 driven by a power plant (e.g., an internal combustion engine, a hybrid engine, a fuel cell, etc.) as is conventionally known. The vehicle 100 further includes brakes 115 for braking the wheels 110 in response to a braking system. For example, the braking system can include a hydraulic brake controller 120, which is part of the vehicle control system 105, coupled to the brakes 115 via hydraulic lines 125. The hydraulic brake controller 120 is in communication with, for example, a braking control module (discussed below).

The vehicle 100 includes sensors and actuators (best shown in FIG. 2) coupled to a vehicle controller 127 of the vehicle control system 105. The vehicle controller 127 receives signals from the sensors over a controller area network ("CAN") and transmits signals to the actuators over the CAN bus 130. The signals include information, such as addresses, instructions, data, codes, values (e.g., amplitude values, frequency values), events, states, and similar items, which may be communicated via signals (e.g., analog signals, digital signals) or stored in memory.

The vehicle controller 127 uses sensor information to determine what actions to take to maintain or improve the performance, stability, and safety of the vehicle 100. Exemplary sensors include wheel speed sensors 135 (FIG. 1), a steering angle sensor, an accelerator pedal sensor, a yaw rate sensor 138, and an acceleration sensor 140. Broadly speaking, a sensor detects a physical property (or parameter) and generates an electric signal correlated to or having information related to the parameter. For example, a wheel speed sensor 135 senses a rotational speed of a wheel 110 and communicates information related to the speed of the wheel 110. As another example, the acceleration sensor 140 senses an acceleration of the vehicle 100 and communicates information related to the acceleration of the vehicle 100. Exemplary information related to the acceleration of the vehicle 100 includes an acquired acceleration value and an offset value (discussed below). Therefore, it should be understood that the term "acceleration signal" refers to a signal communicating information related to the acceleration (such as an offset), not just an acceleration value.

Figure 2:
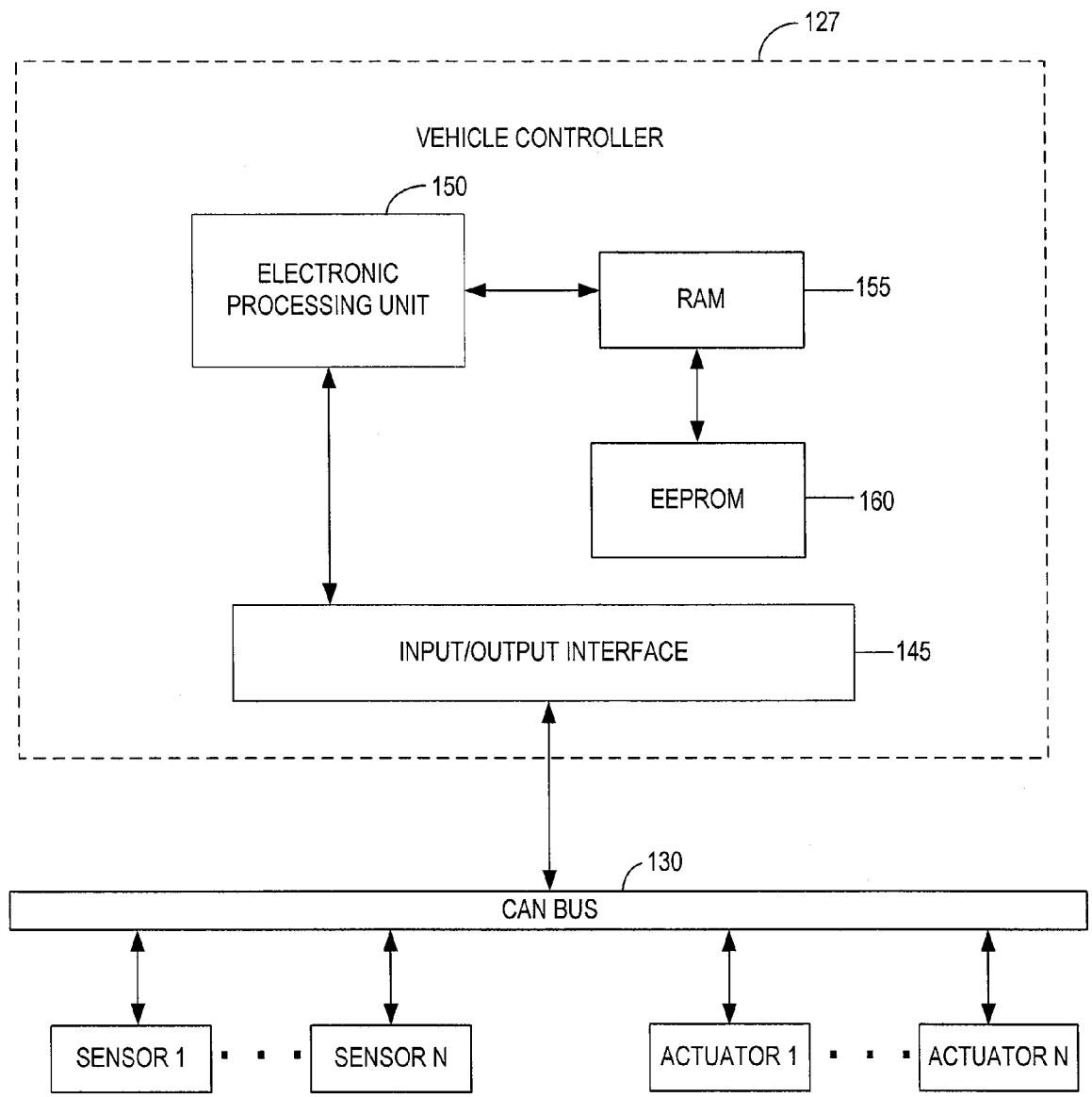
FIG. 2 schematically illustrates a portion of a vehicle control system according to one embodiment of the invention.

Referring to FIG. 2, the vehicle controller 127 includes an input/output interface 145, an electronic processing unit ("EPU") 150, and one or more electronic memories, such as a random access memory ("RAM") module 155 and an electronically erasable programmable read-only memory ("EEPROM") module 160. As shown in FIG. 2, the input/output interface 145 transmits and receives information over the CAN bus 130. The EPU 150 receives information from the input/output interface 145 and processes the information by executing one or more applications or modules. Exemplary modules include a braking control module, a traction control module, a passenger restraint control module, an electronic stability control (ESC) module, a malfunction monitoring module, a failure handling module, and a good-signal checking module. While the various modules are described as distinct modules, it should be understood that the modules can be integrated or incorporated with one another. For example, the ESC module may include or include aspects of the braking control module. It should also be noted that the information from the sensors can be received directly or indirectly from the sensors. That is, the information can be sent or delivered to a module via other vehicle systems and or modules.

The electronic processing unit 150 transmits information via the input/output interface 145 to control a plurality of actuators. The actuators can be, for example, hydraulic pumps of the hydraulic brake controller 120, switches or motors used with occupant restraints in an occupant restraint system, or switches or control devices used with a visual display for communicating information to a user. Before proceeding further, it should be understood that the vehicle controller 127 can comprise multiple control devices, and other buses or networks can be used in place of or in addition to the CAN bus 130.

As an exemplary control module, the electronic stability control ("ESC") module utilizes several sensors to estimate a current "state" of the vehicle 100. The ESC module receives information from the sensors and sends information to, for example, the hydraulic brake controller 120. The ESC module receives information from, for example, a steering-wheel angle sensor, a yaw rate sensor, an acceleration sensor, and a wheel speed sensor. The ECU module detects circumstances that may affect the stability of the vehicle 100 or a driver's control of the vehicle 100. Based on the sensed information, the ESC system is capable of controlling various systems and functions within the vehicle 100 such as the braking control module, the traction control module, the passenger restraint module, etc.

The accuracy and timeliness of controlling various systems and functions of the vehicle 100 are factors in their effectiveness. However, the sensors coupled to the ESC module are subject to error and/or noise. The sensors used by the ESC module can be disturbed or corrupted by the environment of the vehicle 100. For example, the sensors (and, more particularly, the information they provide) can be disturbed or corrupted if the vehicle 100 is traveling uphill, downhill, or over bumpy terrain. For a specific example, an acceleration sensor for acquiring vehicle acceleration information (e.g., a lateral acceleration, a longitudinal acceleration, a vertical acceleration) can be corrupted by the environment of the vehicle 100, such as the vehicle 100 traveling up a curvy hill. Various offsets can be estimated and used to compensate sensor signals to more accurately represent the state of the vehicle 100. For example, an exemplary system for calculating offsets is shown in U.S. patent application Ser. No. 12/271,490, entitled "System and Method for Compensating Sensor Signals", the entire content of which is incorporated herein by reference. The acceleration sensor offset is combined with a corrupted acceleration sensor signal to generate a compensated acceleration sensor signal. The compensated acceleration sensor signal is sent to the ECU of the ESC system.

The sensors can also be disturbed or corrupted by a fault with the sensor. For example, a sensor can also be disturbed or corrupted if the position of the sensor is not substantially ideal (e.g., the sensor moves slightly because of a loose fastener). For another example, a sensor can be by disturbed or corrupted if the sensor or an aspect of the sensor is broken or faulty. Moreover, white noise and sensor power fluctuations can also introduce additional errors to a sensor. As a result, the sensor may provide information to the ECU that cannot accurately represent the state of the vehicle 100. If the sensor has a fault that is unrelated to the operation of the vehicle 100 and cannot be properly compensated, then the sensor has a malfunction, although the sensor malfunction may not create a system malfunction in all systems that utilize the sensor information. In some situations, however, a sensor malfunction can affect the performance of the vehicle 100.

For a specific example, the ESC module requires a substantially accurate estimation or calculation of the longitudinal acceleration of the vehicle 100. The sensed longitudinal acceleration of the vehicle 100 is not always equivalent to the actual acceleration of the vehicle (e.g., the longitudinal acceleration can be affected by a vertical incline or decline), which could result in errors in the determinations made by the ESC module.

More specifically, the vehicle 100 includes an acceleration sensor 140, a wheel speed sensor 135, and a yaw rate sensor 138. In one implementation, the acceleration sensor 140 is a sensor suite that includes multiple accelerometers, each designed to measure a particular acceleration (such as lateral, longitudinal, vertical, etc.). The accelerometers can be mounted on the axle near the wheel, and can be in the vicinity of the wheel speed sensors 135. The accelerometer may be a small, low-cost accelerometer including a MEMS (microelectromechanical system) accelerometer. Alternatively, the acceleration sensor 140 may be a single or multi-dimensional accelerometer mounted centrally in the vehicle 100. The sensor 140 shown in FIG. 1 is a three-dimensional accelerometer that acquires a lateral acceleration, a longitudinal acceleration, and a vertical acceleration.

As used herein, the term "acceleration sensor," without modification may refer to an acceleration sensor that provides an acceleration value in a specific dimension (e.g., a lateral acceleration sensor or a lateral acceleration sensor) or an acceleration sensor suite including multiple acceleration sensors (e.g., multiple accelerometers).

Figure 3:
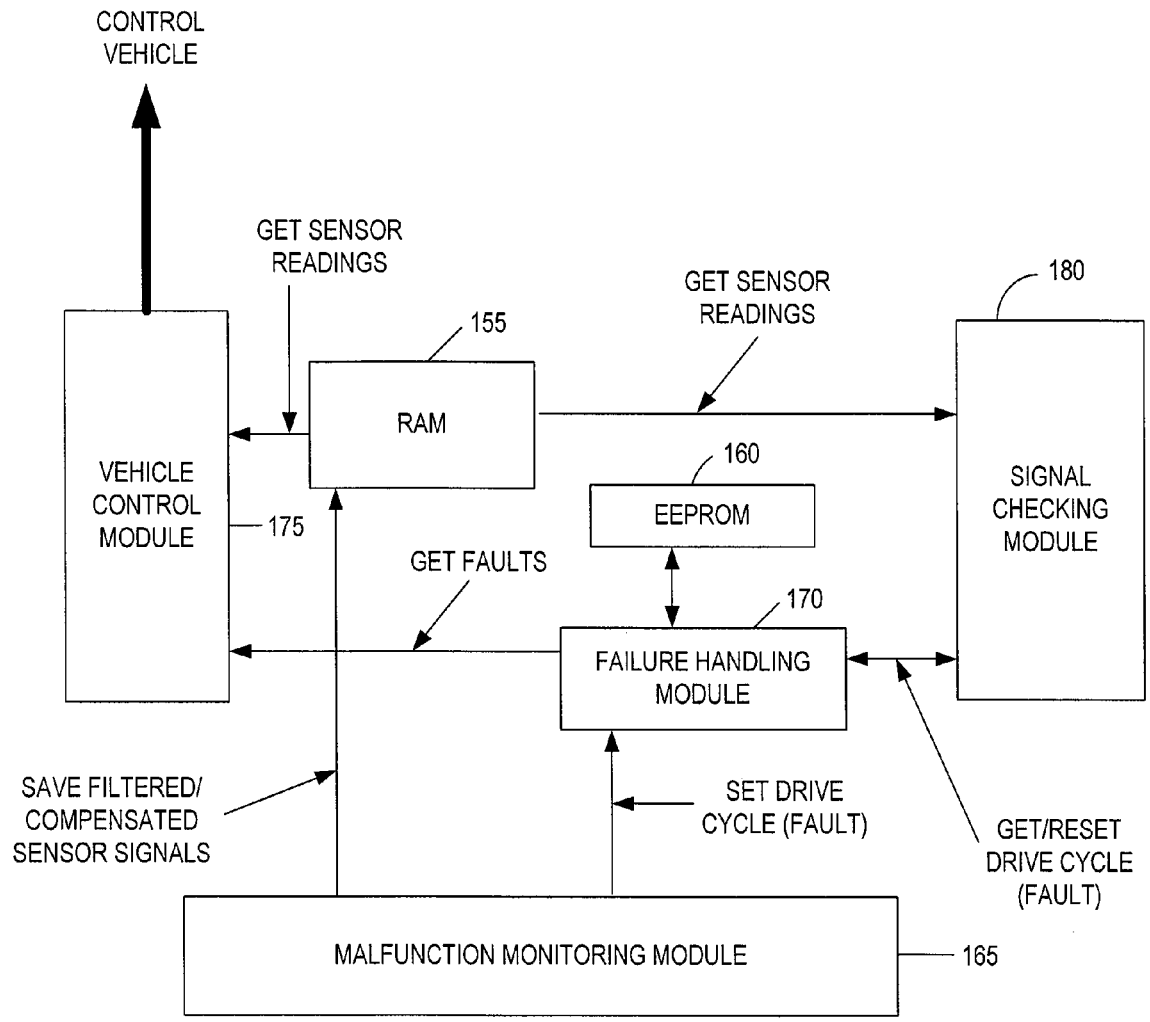
FIG. 3 schematically illustrates the functional operation of various components and modules of the vehicle control system of FIG. 2.

FIG. 3 illustrates the functional operation of applications or modules executed by the EPU 150 according to one implementation. As shown in FIG. 3, the EPU 150 executes a malfunction monitoring module 165, a failure handling module 170, a vehicle control module 175 (e.g., the ESC module), and a signal checking module 180. The malfunction monitoring module 165 receives sensor signals from the sensors over the bus 130 (e.g., through the input/output interface 145) and saves sensor information into memory (e.g., RAM 155). The malfunction monitoring module 165 saves sensor information in a number of different ways. Depending on the particular embodiment, it saves raw sensor information, filtered sensor information, compensated sensor information, or a combination of the same to into memory. For example, the acceleration sensor 140 may become dirty or damaged, which can affect the operation of the sensor 140. The malfunction monitoring module 165 can apply an offset (positive or negative) to a signal received from a particular sensor to compensate for the sensor's deterioration and stores the compensated sensor value to memory. In some implementations, if a particular sensor's offset gets too large (in either the positive or the negative direction), the malfunction monitoring module 165 considers the sensor to be malfunctioning and generates a fault signal. Based on faults determined by the malfunction monitoring module 165, the vehicle control module 175 activates one or more tell-tale indicators (or warning lights) in the vehicle 100 (e.g., on the vehicle's dashboard). The tell-tale indicator 185 (FIG. 1) alerts the operator of the faulty sensor. The vehicle control module 175 may also modify its operation of a particular control system or process. For example, if a particular sensor is malfunctioning, the vehicle control module 175 may change its ESC operation from a first operating state (e.g., fully functional) to a second operating state (e.g., limited functionality or inactive). It should be understood that the malfunction monitoring module 165 may also store other information to memory, such as fault information, offset information, and/or other statistical information about particular sensors.

Referring again to FIG. 3, when the malfunction monitoring module 165 detects a malfunctioning or faulty sensor, the module 165 generates a fault signal and sends the fault signal to the failure handling module 170. The fault signal includes fault information based on the particular fault or malfunction observed by the malfunction monitoring module 165. The failure handling module 170 stores the fault information and corresponding counter or cycle information (referred to as "drive cycle" information) in memory (e.g., EEPROM 160). The drive cycle information helps to indicate what signal check functions (discussed below) should be performed by the signal checking module 180 during the next drive cycle. For example, if the malfunction monitoring module 165 detects that the acceleration sensor 140 is malfunctioning and generates a fault signal, the failure handling module 170 saves drive cycle information to memory indicating that the signal checking module 180 should check the acceleration sensor 140 during subsequent operation of the vehicle 100.

As shown in FIG. 3, the vehicle control module 175 requests the currently-detected faults from the failure handling module 170. The failure handling module 170 retrieves the stored fault information from memory and sends the fault information to the vehicle control module 175. In other implementations, however, the vehicle control module 175 obtains currently-detected faults from the malfunction monitoring module 165, the bus 130, or other components included in the system 105.

After the vehicle control module 175 obtains the currently-detected faults, it determines how to handle the current faults. In some implementations, the vehicle control module 175 activates one or more tell-tale indicators 185 in the vehicle 100 (e.g., on the vehicle's dashboard or instrument panel) in response to the currently-detected faults. The warning lights alert the vehicle operator of the one or more faulty sensors detected by the malfunction monitoring module 165. In other implementations, the vehicle control module 175 modifies its operation of a particular control module or process, such as ESC functionality, in response the detected faults. For example, if a particular sensor is malfunctioning, the vehicle control module 175 may change its ESC operation from a first operating state to a second operating state. In some implementations, the first operating state includes a fully active state where the vehicle control module 175 considers substantially all information from substantially all sensors 20. The second operating state can include an intermediate functional state where the vehicle control module 175 ignores sensor information from one or more particular malfunctioning sensors, but continues to perform ESC functionality. Alternatively, the second operating state can include a deactivated state. For example, in some implementations, the vehicle control module 175 deactivates its ESC functionality if one or more "important" sensors are malfunctioning, which malfunction would cause a lack of proper information for the ESC to function properly. If the vehicle control module 175 deactivates its ESC functionality or other types of vehicle control or monitoring functionality, then the vehicle control module 175 can activate one or more warning lights that warn the vehicle operator of the modified operating state.

As shown in FIG. 3, if the vehicle control module 175 continues to operate the ESC functionality (e.g., continues to monitor for oversteer and understeer conditions), the vehicle control module 175 obtains sensor readings from memory (e.g., RAM 155). In some implementations, the vehicle control module 175 can also or alternatively obtain sensor readings from the malfunction monitoring module 165, the bus 130, or both. If the module 175 is ignoring particular sensor information based on currently detected faults, then it does not need to request this sensor information or can simply ignore any such sensor information received from memory, the malfunction monitoring module 165, the bus 130, or combinations thereof.

The signal checking module 180 performs various signal checks to determine whether a previously-detected sensor malfunction no longer exists. As shown in FIG. 3, the signal checking module 180 retrieves drive cycle information stored in memory (e.g., the EEPROM 160). In some implementations, the signal checking module 180 is initialized during each new ignition cycle and retrieves the stored drive cycle information upon each initialization. In other implementations, the signal checking module 180 retrieves stored drive cycle information from memory at various times while the controller 105 is operating and the signal checking module 180 performs signal checks based on the stored drive cycle information continuously or at a designated time (e.g., at predetermined intervals or in a next ignition cycle).

As described below with respect to FIGS. 5-9, after the signal checking module 180 retrieves stored drive cycle information from memory, the module 180 executes one or more signal check functions to determine whether a previously-detected fault still exists. As part of executing signal check functions, the signal checking module 180 retrieves sensor information from memory. In other implementations, the signal checking module 180 retrieves sensor information or readings from the malfunction monitoring module 165 and/or the bus 130. The sensor information can include compensated or filtered sensor information (e.g., values), raw sensor information, sensor offsets, and/or other statistical information about a particular sensor. The signal checking module 180 uses the sensor information to determine whether a previously-detected malfunction no longer exists. In some implementations, the signal checking module 180 retrieves sensor information from the previously-detected malfunctioning sensor. In other implementations, the signal checking module 180 also retrieves sensor information from sensors other than the previously-detected malfunctioning sensor. For example, the signal checking module 180 can use information from functioning sensors to determine whether a previously-detected malfunction or sensor reading is implausible.

If the signal checking module 180 performs one or more signal check functions related to a particular previously-detected fault and determines that the fault no longer exists, the signal checking module 180 resets the corresponding fault information and/or drive cycle information in memory to indicate that the previously-detected fault no longer exists. In the examples herein, the signal checking module 180 resets the drive cycle information by generating a reset signal. The failure handling module 170 receives the reset signal and updates the fault information and/or drive cycle information stored in memory to indicate that the previously-detected fault no longer exists. When the vehicle control system 175 subsequently requests the current faults from the failure handling module 170, the failure handling module 170 informs the vehicle control module 175 that the previously-detected fault no longer exists. The vehicle control module re-assesses the current faults and, in some implementations, disables a previously-activated tell-tale indicator 185 within the vehicle 100, returns system operation back to the first or original operating state (e.g., a fully active and functional state), or both.

If the signal checking module 180 determines that the fault still exists, the signal checking module 180 sets the corresponding fault and/or drive cycle information in memory similar to how the malfunction monitoring module 165 sets the drive cycle information when it detects a fault. By setting the corresponding fault and/or drive cycle information in memory, the signal checking module 180 ensures that the fault information and/or drive cycle information stored in memory will continue to indicate that the fault exists so that (1) the vehicle control module 175 is informed of the existence of the fault and (2) the signal checking module 180 runs another signal check on the fault during subsequent operation. In some implementations, the signal checking module 180 sets the fault and/or drive cycle information by generating a set signal. The failure handling module 170 receives the set signal and ensures that the fault information and/or drive cycle information in memory continues to indicate that the previously-detected fault still exists. In other implementations, the signal checking module 180 simply fails to reset the fault and/or drive cycle information, which retains the fault and/or drive cycle information in the same condition as before the signal checking module 180 performed the required signal check functions.

Figure 4:
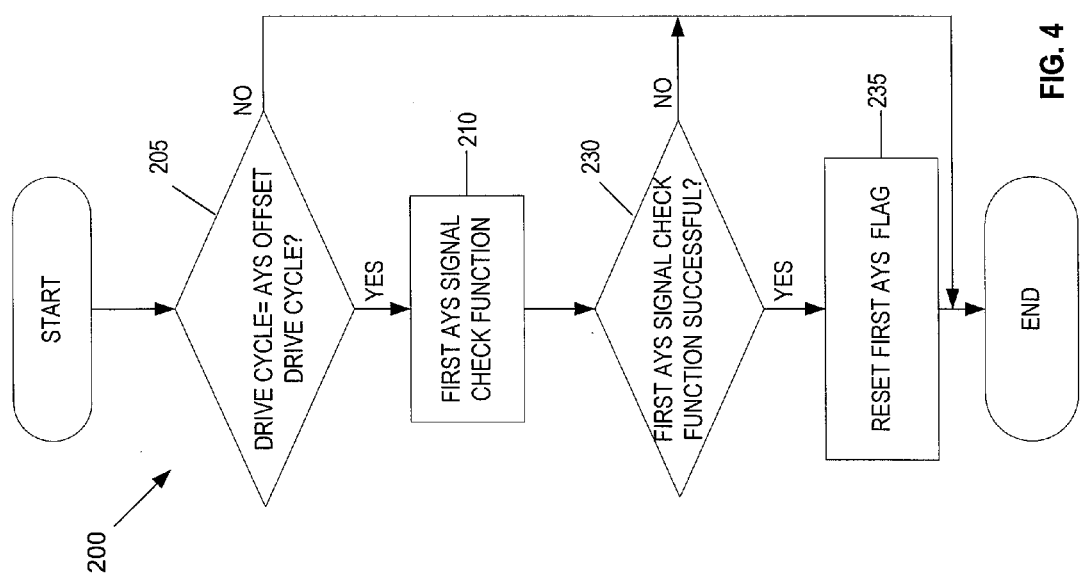
FIG. 4 is a flow chart illustrating a first lateral acceleration sensor signal check performed by the signal checking module of FIG. 3.

FIG. 4 illustrates a first lateral acceleration sensor (AYS) signal check 200 according to one implementation. An offset, such as a long term compensation offset, can be applied to the AYS signal to compensate for misalignments and minor offset failures of the AYS. However, if the offset becomes too large, the malfunction monitoring module 165 identifies a malfunction. As shown in FIG. 4, the signal checking module 180 obtains the stored fault and/or drive cycle information and determines whether the retrieved information includes drive cycle information for a first AYS malfunction (step 205) relating to an offset. The retrieved drive information can include a flag or bit (e.g., a first AYS offset drive cycle bit or flag) that is set if the first AYS malfunction is detected by the malfunction monitoring module 165. If this flag is set, the signal checking module 180 executes a first AYS signal check function 210. If this flag is not set, the signal checking module 180 checks for other flags, exits the signal check 180, or executes other signal checks.

Figure 5:
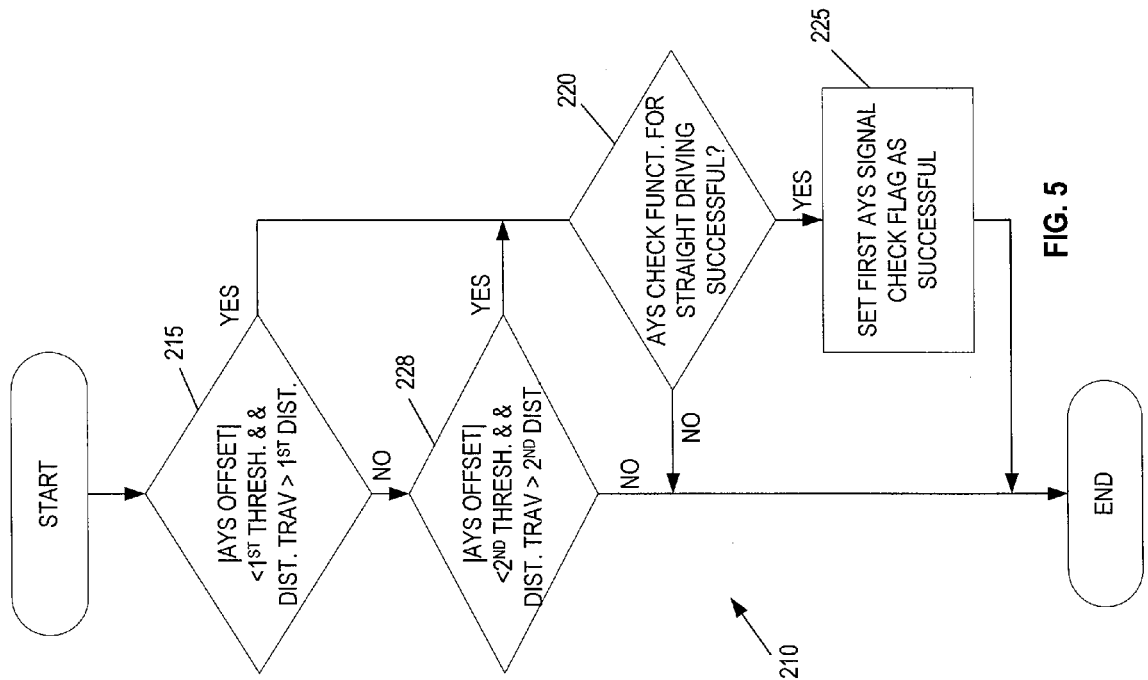
FIG. 5 is a flow chart illustrating a first lateral acceleration sensor signal check function performed by the signal checking module of FIG. 3.

Generally, the first AYS signal check function 210 determines whether the AYS offset is less than one or more thresholds, which can be based on a distance traveled by the vehicle 100. The first AYS signal check function 210 determines whether a malfunction exists based on whether the AYS offset falls within a predetermined range while the vehicle has traveled more than a predetermined distance. As shown in FIG. 5, the signal checking module 210 begins the first AYS signal check function 210 by determining whether an absolute value of the AYS offset is less than a first threshold (e.g., 0-20 m/s$^2$) (step 215). The first threshold can be based on a first distance traveled by the vehicle 100 (e.g., 0-100 km). The first threshold is typically less than (or tighter) than a second threshold (discussed below), if present, since the first distance traveled (e.g., 0-100 km) is much less than the related distance (discussed below) for the second threshold.

If the signal checking module 180 determines that the AYS offset is less than the first threshold for the first distance, the signal check function 210 proceeds to step 220. In the implementation shown, the signal check function 210 includes an AYS signal check function for straight driving (discussed below). If the AYS signal check function for straight driving is successful, then the signal checking module 180 sets a first AYS signal check flag as successful (step 225). Otherwise, the signal checking module 180 exits the first AYS signal check function 210, which indicates that the function did not produce a successful result.

Referring again to FIG. 5, the first AYS signal check function 210 determines whether an absolute value of the AYS offset is less than a second threshold (e.g., 0-20 m/s$^2$ and greater than the first threshold) (step 228). The second threshold can be based on a second distance traveled by the vehicle 100 (e.g., 0-100 km and greater than the first distance). If the signal checking module 180 determines that the AYS offset is less than the second threshold for the second distance, the signal check function 210 proceeds to step 220. Otherwise, the signal checking module 180 exits the first AYS signal check function 210, thereby indicating the function did not have a successful result.

If the signal checking module 180 determines that the first AYS malfunction no longer exists (i.e., the first AYS signal check function is successful (step 230)), the signal checking module 180 resets the first AYS signal check flag (step 235). With the flag reset, the failure handling module 170 ensures that the fault information and/or drive cycle information stored in memory no longer indicates that a first AYS offset malfunction exists. Based on this updated information, the vehicle control module 175 disables the tell-tale indicator, modifies its operation back to the first or original operating state, or both. As shown in FIG. 4, after resetting the first AYS signal check flag at step 235, the signal checking module 180 exits the first AYS signal check 200. In some implementations, after exiting the first AYS signal check 200, the signal checking module 180 executes other signal checks.

If the signal checking module 180 determines that the first AYS malfunction still exists (i.e., fails step 210), the failure handling module 170 ensures that the fault information or drive cycle information stored in memory continues to indicate that the first AYS malfunction exists. In some implementations, the signal checking module 180 performs the first AYS signal check function 200 only during certain driving maneuvers or patterns. For example, the signal checking module 180 can execute the first AYS signal check 200 when the vehicle 100 is traveling in a forward direction on a substantially straight path.

As noted above, the signal checking module 180 can execute a variety of signal checks and signal check functions for various malfunctions and combinations of malfunctions detected by the malfunction monitoring module 165. For example, the acceleration sensor 140 may experience a malfunction related to the acquired acceleration signal.

Figure 6:
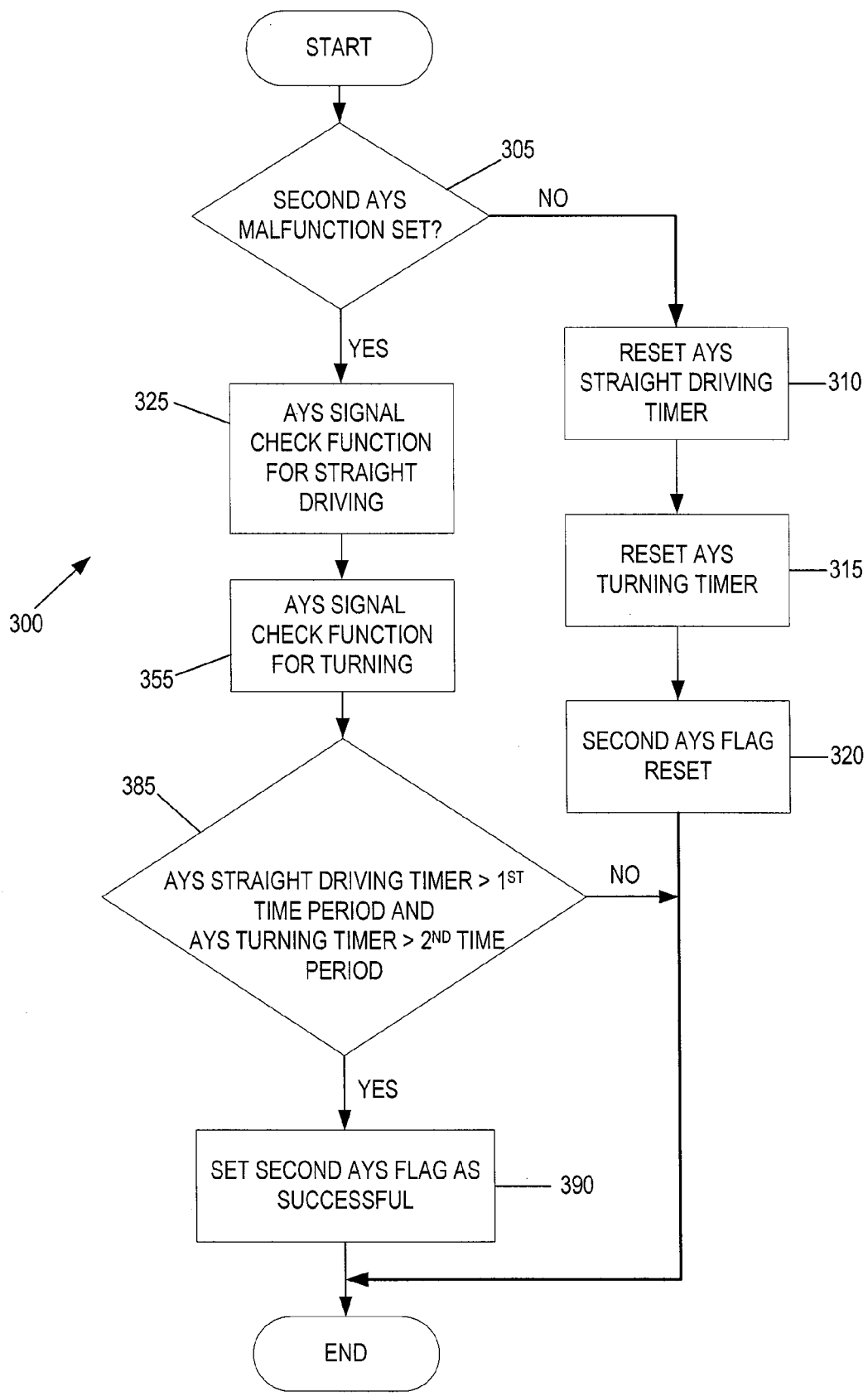
FIG. 6 is a flow chart illustrating a second lateral acceleration sensor signal check performed by the signal checking module of FIG. 3.

FIG. 6 illustrates a second AYS signal check 300 according to one implementation. The signal checking module 180 obtains the stored fault and/or drive cycle information and determines whether the retrieved information includes drive cycle information for a second AYS malfunction (step 305). The second AYS malfunction indicates that one of multiple malfunctions was identified by the malfunction monitoring module 165. Exemplary malfunctions related to the second AYS malfunction include: implausible sensitivity of the AYS, implausible offset for the AYS, a stuck signal from the AYS, and a wrong sign with the signal from the AYS. If the malfunction monitoring module 165 identifies any of the just-recited malfunctions, then the retrieved drive cycle information includes a flag or bit (e.g., a second AYS drive cycle bit or flag). If this flag is set, the signal checking module 180 proceeds to step 325. If this flag is not set, the signal checking module 180 resets multiple timers (discussed below) (steps 310 and 315) and reset the second AYS flag (step 320) as satisfactory. In addition, the signal checking module 180 checks for other flags, exits the signal check 180, or executes other signal checks.

Figure 7:
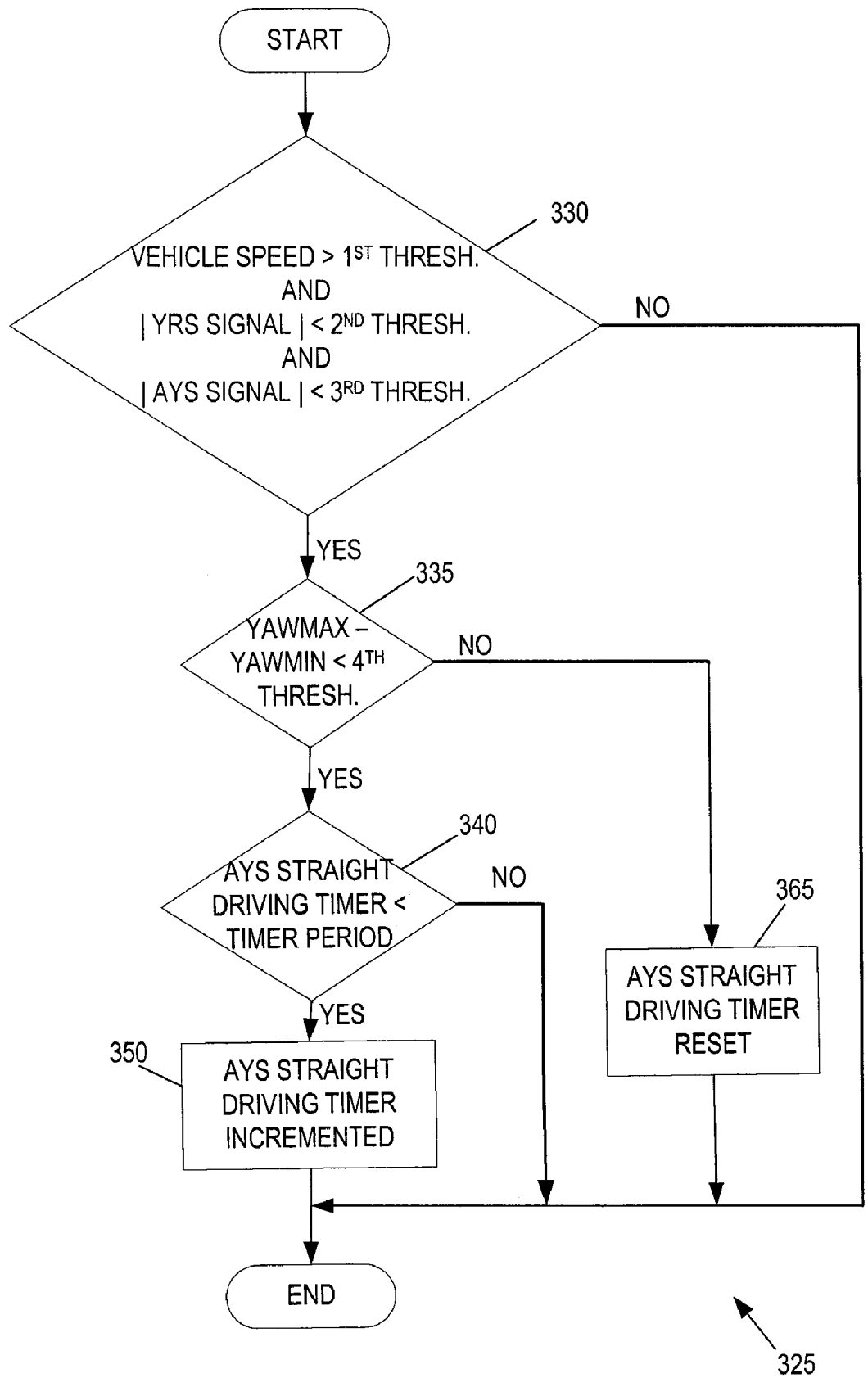
FIG. 7 is a flow chart illustrating a lateral acceleration sensor signal check function for straight driving, the signal check being performed by the signal checking module of FIG. 3.

At step 325, the signal checking module performs an AYS signal check function for straight driving. With reference to FIG. 7, the function 325 first determines (step 330) whether the vehicle speed is greater than a first threshold (e.g., 0-100 km/h), the absolute value for the yaw rate sensor (YRS) signal is less than a second threshold (e.g., 0-100 deg/s), and the absolute value for the AYS signal is less than a third threshold (e.g., 0-20 m/s$^2$). In short, step 330 determines that the vehicle is traveling above a defined minimum speed, is not turning above a defined minimum rate, and does not have a lateral acceleration above a defined amount; i.e., the vehicle 100 is traveling straight ahead with little acceleration. If the vehicle 100 is not traveling substantially straight ahead, then the function 325 ends. Before proceeding further, it is envisioned that each of the first, second, and third thresholds have a value greater than zero to indicate the vehicle is not traveling substantially straight ahead. However, it is also envisioned that one or more of the first, second, and third thresholds may be set to zero in some implementations.

At step 335, the signal checking module 180 compares a value referred to as YawMax to a value referred to as YawMin. If the two values differ by an amount less than a fourth threshold (e.g., >0-100 deg/s), then the signal checking module 180 proceeds to step 340. If the two values differ by an amount greater than the fourth threshold, then the signal checking module 180 resets (step 345) a timer (or counter) (discussed below). The YawMax value is the maximum value among one or more modeled yaw rate values and a measured yaw rate value, and the YawMin value is the minimum value among the modeled yaw rate values and the measured yaw rate value. The measured yaw rate value is obtained from the yaw rate sensor 138, and the modeled yaw rate values can be calculated from the wheel speed sensors 135, and calculated from the AYS 140 as is known in the art. If the timer traverses a time period (e.g., O-s) (step 340), the signal checking module 180 exists the function 325 of FIG. 7. Otherwise, the timer (or counter) is increased by a time (or count) (step 350).

Figure 8:
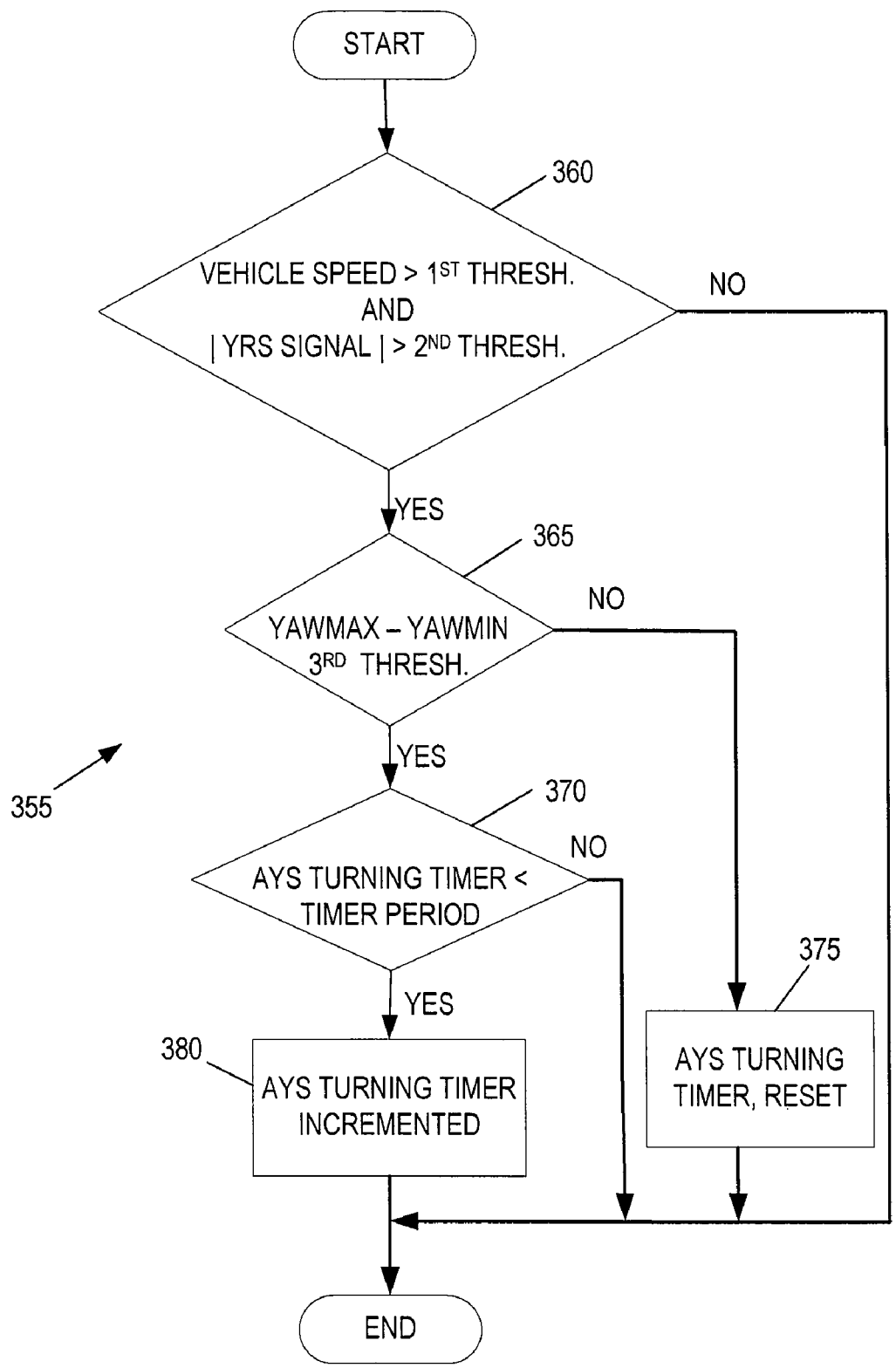
FIG. 8 is a flow chart illustrating a lateral acceleration sensor signal check function for turning or cornering, the signal check being performed by the signal checking module of FIG. 3.

Referring back to FIG. 6, the signal checking module 180 also performs an AYS signal check function 355 for turning. With reference to FIG. 8, the AYS function 355 first determines (step 360) whether the vehicle speed is greater than a first threshold (e.g., 0-100 km/h), and the absolute value for the yaw rate sensor (YRS) signal is greater than a second threshold (e.g., 0-100 deg/s). Typically, the first and second thresholds have a value greater than zero, but one of the values can equal zero. In short, step 360 determines that the vehicle is traveling above a defined minimum speed, and is turning above a defined minimum rate; i.e., is turning or traveling on a curve. If the vehicle is not turning, then the function 355 ends, otherwise, the signal checking module 180 proceeds to step 365.

At step 365, the signal checking module compares the YawMax value to the YawMin value. If the two values differ by an amount less than a third threshold (e.g., >0-100 deg/s), then the signal checking module proceeds to step 370. If the two values differ by an amount greater than the third threshold, then the signal checking module resets a timer (or counter) (discussed below) at step 375. As discussed earlier, the YawMax value is the maximum value among the modeled yaw rate values and the measured yaw rate value, and the YawMin value is the minimum value among modeled yaw rate values and the measured yaw rate value. If the timer traverses a time period (e.g., 0-5 s) (step 370), the signal checking module 180 simply exists the function 355 of FIG. 8. Otherwise, the timer (or counter) is increase by a time (or count) (step 350).

Referring back to FIG. 6, the signal checking module 180 proceeds to determine whether the first timer related to the AYS signal check function 325 for straight driving is greater than the first time period (e.g., 0-5 s) and the second timer related to AYS signal check function 355 for turning is greater than the second time period (e.g., 0-5 s). If both functions 325 and 355 result in timers greater than their respective time periods (step 385), then the signal checking module 180 resets the second AYS signal check flag to indicate that the previously-detected malfunction no longer exists (step 390). With the flag reset, the failure handling module 170 ensures that the fault information and/or drive cycle information stored in the memory no longer indicates that a second AYS malfunction exists. Based on this updated information, the vehicle control module 175 changes a tell-tale indicator, modifies its operation back to a first or original operating state, or both. As shown in FIG. 6, after resetting the second AYS check flag at step 390, the signal checking module 180 exits the second AYS signal check 300. In some implementations, after exiting the second AYS signal check 300, the signal checking module 180 executes other signal checks.

If the signal checking module 180 determines that the second AYS malfunction still exists (i.e., fails step 385), the failure handling module 170 ensures that the fault information or drive cycle information stored in memory continues to indicate that the second AYS malfunction exists.

By performing both functions 325 and 355, the signal check 300 determines whether the AYS no longer includes a stuck signal. Further, by performing the YawMax to YawMin comparisons, the signal check 300 determines whether the AYS sensor no longer has implausible sensitivity, an implausible offset, or a wrong sign. In effect, the YawMax to YawMin comparisons allow the AYS sensor to be compared with other sensors that presumably do not have a malfunction.

Thus, the invention provides, among other things, a controller for determining whether a previously-detected, acceleration-sensor malfunction no longer exists. Various features and advantages of the invention are set forth in the following claims.

What is claimed is:

1. A controller for indicating whether a previously-detected, acceleration-sensor malfunction no longer exists, the controller comprising:
    an electronic memory; and
    an electronic processing unit connected to the electronic memory, the electronic processing unit including,
        a malfunction monitoring module configured to monitor the operation of an acceleration sensor and generate a fault signal if the acceleration sensor outputs a lateral acceleration signal that is outside of a first predetermined range, the fault signal containing fault information and causing at least one of a tell-tale indicator to be activated or a vehicle control module to modify its operation from a first operating state to a second operating state,
        a failure handling module configured to cause drive cycle information and the fault information to be stored in the electronic memory, and
        a signal checking module configured to perform a signal check after the malfunction monitoring module generates the fault signal, the signal check including
            retrieving the drive cycle information from the electronic memory,
            determining whether to execute a signal check function based on the drive cycle information,
            executing the signal check function with the lateral acceleration signal,
            determining whether the lateral acceleration signal passes the signal check function by comparing the lateral acceleration signal to a second pre-determined range narrower than the first predetermined range, the lateral acceleration signal passing the signal check if the lateral acceleration signal is within the second pre-determined range, and
            generating a reset signal if the lateral acceleration signal passes the signal check function, the reset signal causing at least one of the tell-tale indicator to be deactivated or the vehicle control module to resume operation in the first operating state.

2. A controller as set forth in claim 1, wherein the malfunction monitoring module monitors the operation of the acceleration sensor by detecting a fault with the lateral acceleration signal and generates the fault signal based on the detection of the fault.

3. A controller as set forth in claim 1, wherein comparing the lateral acceleration signal with the predetermined threshold further includes comparing a lateral acceleration value with the predetermined threshold.

4. A controller as set forth in claim 1, wherein executing the signal check function includes determining a maximum yaw rate value from a measured value from a yaw rate sensor and a modeled value calculated from the acceleration sensor, determining a minimum yaw rate value from the measured value and the modeled value, and comparing the difference of the measured maximum yaw rate value and the modeled maximum yaw rate value, and the difference of the measured minimum yaw rate value and the modeled minimum yaw rate value, the differences compared with a predetermined threshold, and wherein the determining whether the lateral acceleration signal passes the signal check function is based on the comparison of the differences with the predetermined threshold.

5. A controller as set forth in claim 1, wherein the lateral acceleration signal includes an offset value.

6. A controller as set forth in claim 5, wherein executing the signal check function includes comparing the offset value with a predetermined threshold, the predetermined threshold being based on a distance value.

7. A controller as set forth in claim 1, wherein executing the signal check function includes performing a plausibility check with the lateral acceleration signal.

8. A controller as set forth in claim 1, wherein executing the signal check function includes performing a stuck signal check with the lateral acceleration signal.

9. A vehicle including the acceleration sensor connected to the controller of claim 1.

10. A vehicle as set forth in claim 9, wherein the acceleration sensor includes a lateral acceleration sensor generating the lateral acceleration signal.

11. A method executed by a controller, including an electronic processing unit and an electronic memory, for determining whether a previously-detected, acceleration-sensor malfunction no longer exists, the method comprising:
    monitoring the operation of an acceleration sensor with a malfunction monitoring module executed by the electronic processing unit;
    generating a fault signal containing fault information with the malfunction monitoring module when the acceleration sensor outputs a lateral acceleration signal that is outside of a first predetermined range;
    causing at least one of a tell-tale indicator to be activated or a vehicle control module to modify its operation from a first operating state to a second operating state;
    storing drive cycle information and the fault information in the electronic memory with a failure handling module executed by the electronic processing unit; and performing a signal check after the generating the fault signal with a signal checking module executed by the electronic processing unit, including
retrieving the drive cycle information from the electronic memory,
determining whether to execute a signal check function based on the drive cycle information,
executing the signal check function with a lateral acceleration signal,
determining whether the lateral acceleration signal passes the signal check function by comparing the lateral acceleration signal to a second pre-determined range narrower than the first predetermined range, the lateral acceleration signal passing the signal check if the lateral acceleration signal is within the second pre-determined range, and
generating a reset signal when the lateral acceleration signal passes the signal check, the reset signal causing at least one of the tell-tale indicator to be deactivated or the vehicle control module to resume operation in the first operating state.

12. A method as set forth in claim 11, wherein monitoring the operation of the acceleration sensor includes detecting a fault with the lateral acceleration signal and generating the fault signal based on the detection of the fault.

13. A method as set forth in claim 11, wherein comparing the lateral acceleration signal with the predetermined threshold further includes comparing a lateral acceleration value with the predetermined threshold.

14. A method as set forth in claim 11, wherein executing the signal check function further includes determining a maximum yaw rate value from a measured value from a yaw rate sensor and a modeled value calculated from the acceleration sensor, determining a minimum yaw rate value from the measured value and the modeled value, and comparing the difference difference of the measured maximum yaw rate value and the modeled maximum yaw rate value, and the difference of the measured minimum yaw rate value and the modeled minimum yaw rate value, the differences compared with a predetermined threshold, and wherein determining whether the lateral acceleration signal passes the signal check function is based on the comparison of the differences with the predetermined threshold.

15. A method as set forth in claim 11, wherein the lateral acceleration signal includes lateral acceleration information including an offset value.

16. A method as set forth in claim 15, wherein executing the signal check function includes comparing the offset value with a predetermined threshold, the predetermined threshold being based on a distance value.

17. A method as set forth in claim 11, wherein executing the signal check function includes performing a plausibility check with the lateral acceleration signal.

18. A method as set forth in claim 11, wherein executing the signal check function includes performing a stuck signal check with the lateral acceleration signal.

* * * * *